April 29, 1969    H. BRAUER ET AL    3,441,517
CERAMIC BODIES OF FERROELECTRIC MATERIAL WITH PEROVSKITE
STRUCTURE WHICH IS PARTIALLY p-CONDUCTING
AND PARTIALLY n-CONDUCTING
Filed March 16, 1966    Sheet __1__ of 5
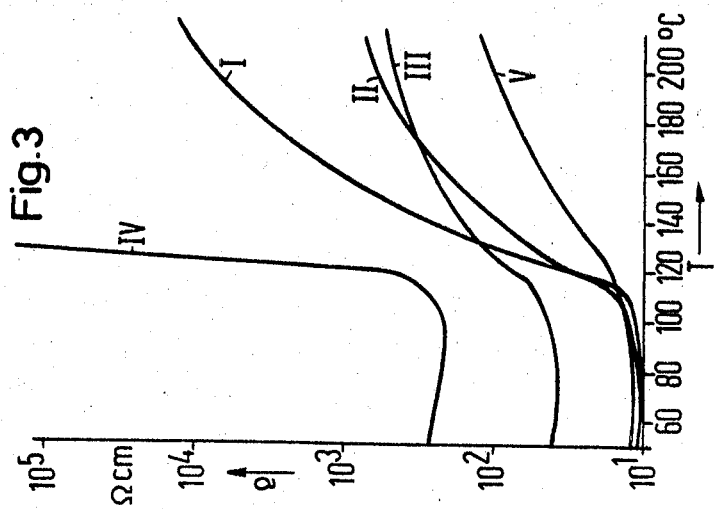
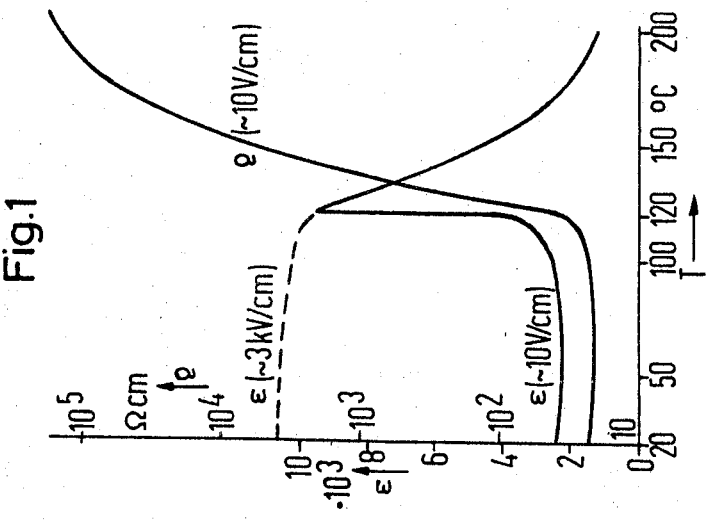
INVENTORS
HORST BRAUER
ERICH FENNER
RENATE KUSCHKE
BY *Stie & Stie* ATTORNEYS

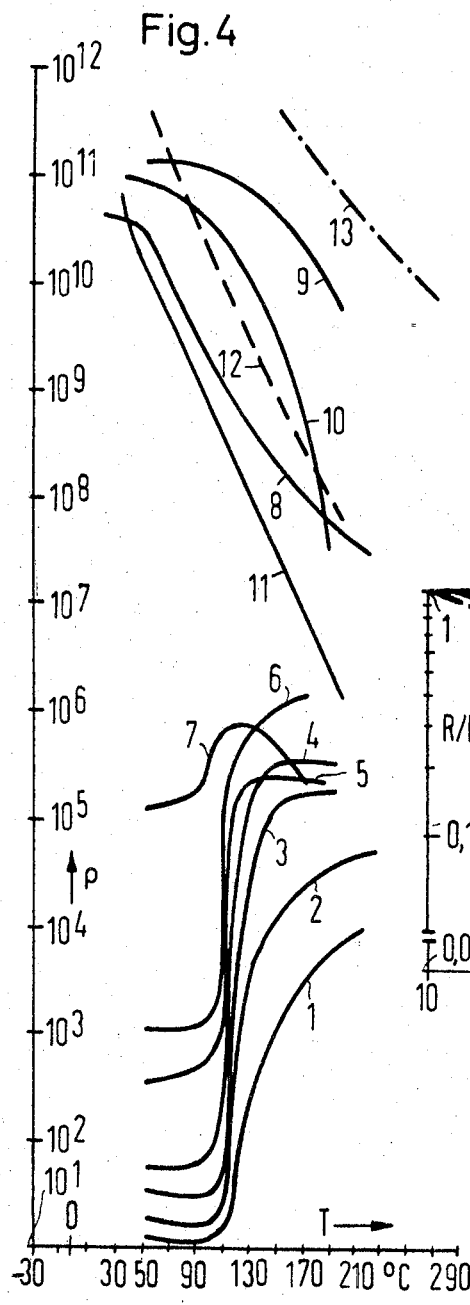
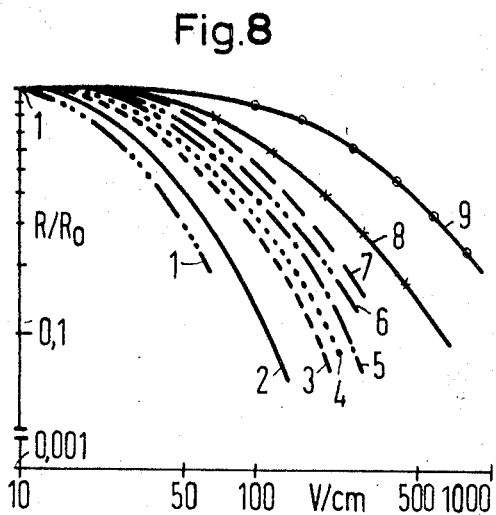

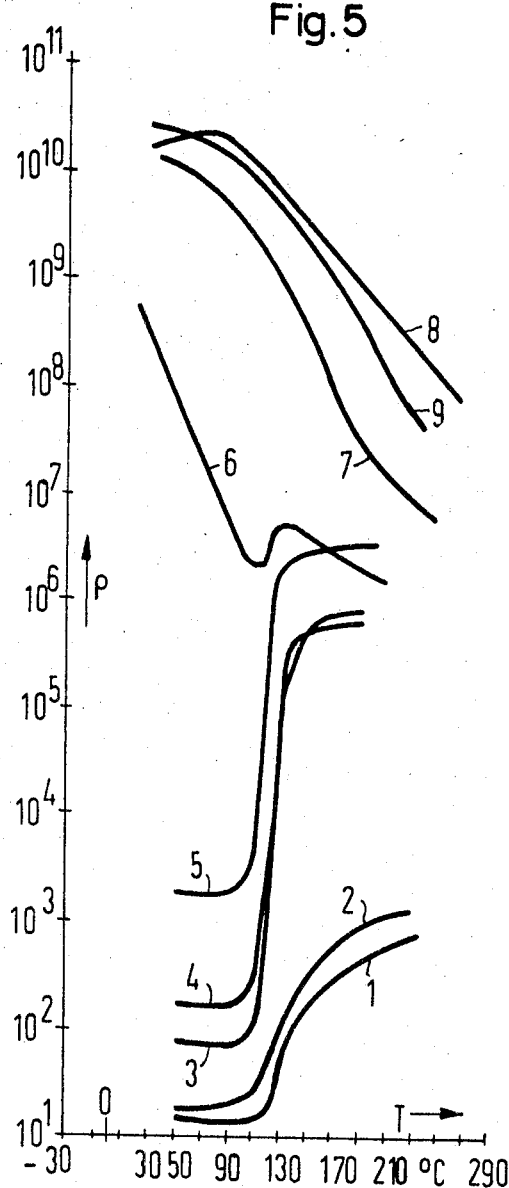

United States Patent Office 3,441,517
Patented Apr. 29, 1969

3,441,517
CERAMIC BODIES OF FERROELECTRIC MATERIAL WITH PEROVSKITE STRUCTURE WHICH IS PARTIALLY p-CONDUCTING AND PARTIALLY n-CONDUCTING
Horst Brauer and Erich Fenner, Munich, and Renate Kuschke, Freising, Germany, assignors to Siemens Aktiengesellschaft, Munich, Germany, a corporation of Germany
Filed Mar. 16, 1966, Ser. No. 534,792
Claims priority, application Germany, Mar. 19, 1965, S 96,060
Int. Cl. H01l 3/18, 3/16
U.S. Cl. 252—520                    11 Claims

ABSTRACT OF THE DISCLOSURE

This invention is directed to a polycrystalline ceramic structure which forms an electronic impedance device. The structure has an average crystallite size between 1 and 50 microns and is partially n-conducting and partially p-conducting. The ceramic body includes a doping substance of perovskite ferromagnetic material having the general formula $Me^{II}Me^{IV}O_3$. The doping substance is between 0.1 and 0.12 by weight and wherein $Me^{II}$ comprises at least one metal selected from the class consisting of barium, strontium and calcium lead, and wherein $Me^{IV}$ comprises at least one metal selected from the class consisting of titanium, zircon and tin. Either copper or iron is added to the structure and concentrated at the crystallite surface.

---

In perovskite structures of the general formula $$Me^{II}Me^{IV}O_3$$

with antimony, niobium, bismuth, tungsten, lanthanum or rare earth (lanthanides) as doping substance for n-conduction, in which, as $Me^{II}$, there is present at least one of the metals barium, strontium, calcium, lead, and as $Me^{IV}$ at least one of the metals titanium, zircon, tin, and the constituent of the $Me^{IV}$ metals is, up to about 2 mol. percent, greater than the constituent of the $Me^{II}$ metals. The magnitude of the crystallites in such body has maximal frequency values which lie on the average between 1 and 50 microns.

Bodies of the type described are known per se and, as a rule, are contacted free of blocking layers according to processes likewise in themselves known, i.e., between the body and the metal coating applied to it there exists no high-ohmic blocking layer or interlayer acting as a blocking layer. Bodies of this type are used as so-called ceramic cold conductor, i.e. as resistors with high positive temperature coefficient of the resistance value in the range of the Curie temperature, also as capacitor dielectric and, with corresponding composition, as piezo elements.

The perovskite material consisting of a structure of sintered granules of the above stated order of magnitude has on the granule surfaces or in the interlayer between the granules (both of which will be designated in the following as granular boundaries) a composition different from the composition in the interior of the granules.

Figure 2:
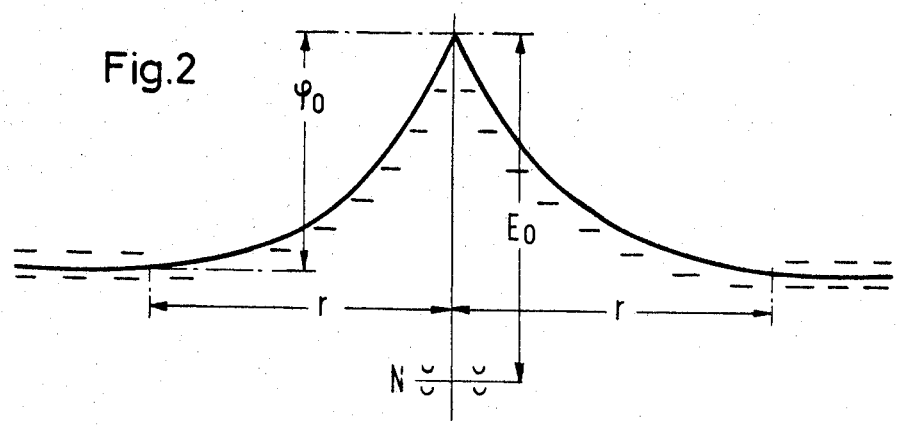
Figure 6:
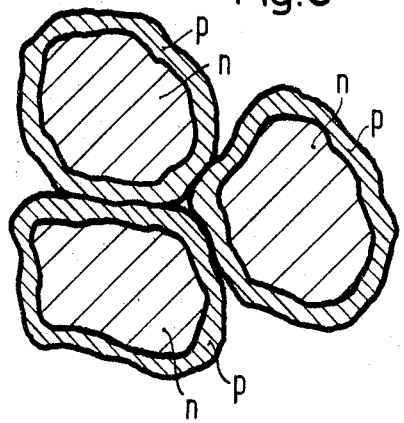
Figure 7:
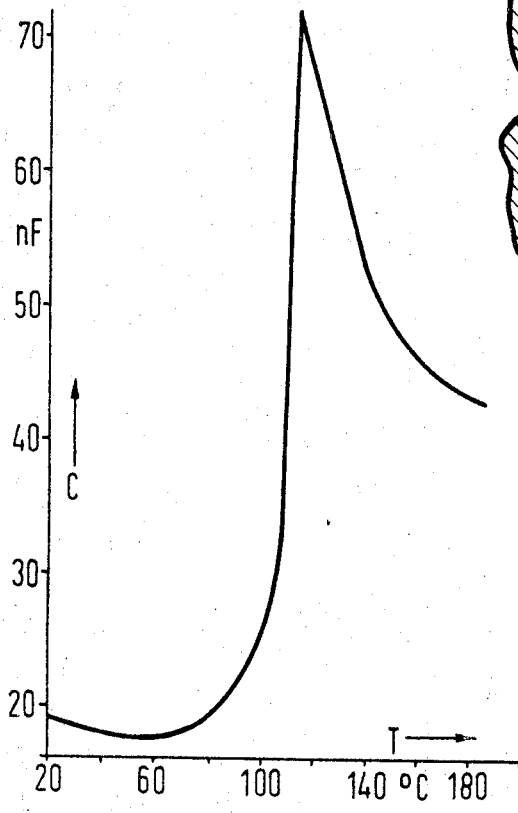
Figure 9:
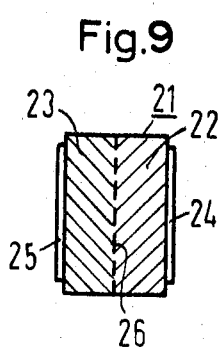
Figure 10:
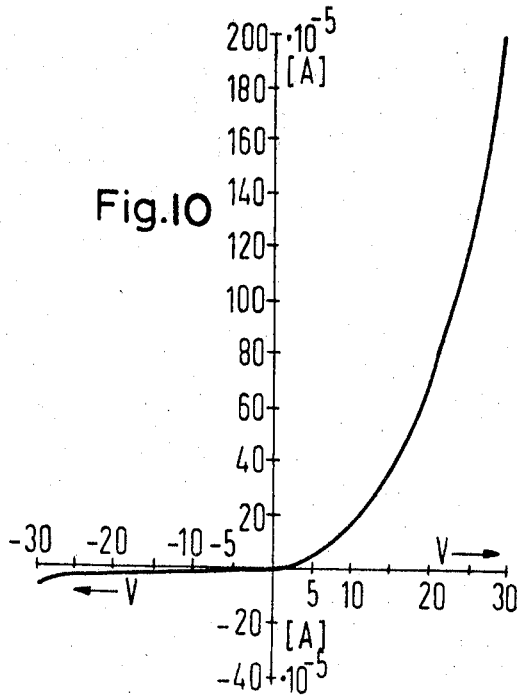
Figure 11:
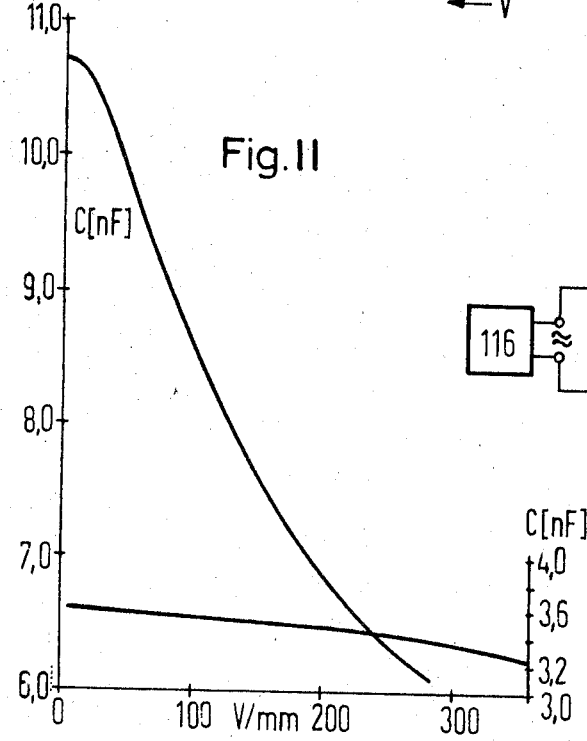
Figure 12:
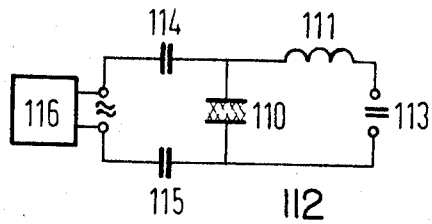

In the drawings:
FIG. 1 is a graph illustrating the characteristics as to specific resistance and dilectric constant of a ferroelectric material;
FIG. 2 is a graph illustrating the resistance increase in such a material;
FIG. 3 is a graph illustrating resistance variation in ferroelectric material resulting from variations in the amounts of impurities in the starting material employed;
FIG. 4 is a graph illustrating the resistance temperature relations of ferroelectric materials having different percentage of copper;
FIG. 5 is a graph similar to FIG. 4, illustrating resistance temperature relations of ferroelectric materials having different percentages of iron;
FIG. 6 is an enlarged rough sectional representation of the crystal granules or particles illustrating the characteristics thereof;
FIG. 7 is a graph illustrating capacitive characteristics of a disk capacitor having a body according to the invention;
FIG. 8 is a graph illustrating resistance characteristics of a ferroelectric material in dependence upon the absence and presence of copper additions and is a graph illustrating resistance ratios of materials having different percentages of copper additions;
FIG. 9 is a sectional view of a barium titanate diode body in accordance with the invention;
FIG. 10 is a graph illustrating the current voltage characteristic of a barium titanate diode such as illustrated in FIG. 8;
FIG. 11 is a graph illustrating the voltage dependence of the dielectric constant; and
FIG. 12 is a circuit diagram for the measurement of the voltage dependence of the capacitance.

Barium titanate presents under certain conditions a preferred perovskite material with the above stated properties. The following considerations, therefore, are to be explained with the example of barium titanate, without thereby limiting the invention only to barium titanate.

Barium titanate ($BaTiO_3$) known as a ferroelectric can, by suitable doping according to the principle of the controlled valence, be converted into the semi-conducting state with n-conduction (for example by installation of antimony oxide $Sb_2O_3$). Here there appears in a restricted temperature range of 20 to 150° C., commencing at the Curie temperature (ca. 115° C.), a steep rise in resistance, which in prior known materials has amounted to a maximum of four powers of ten.

The graph of FIG. 1 presents a summary representation of this property. Plotted are the specific resistance and the dielectric constant $\epsilon$ of the disposed barium titanate as a function of the temperature, at field strength of about 10 v./cm. and 3 kv./cm., respectively.

From prior investigations it was known that the basis for the abnormal resistance increase above the Curie temperature is localized in the granule boundaries (cf. FIG. 2), at which there are disposed acceptor surface terms (N), into which the electrons can pass, whereby there are formed at the granule boundaries space charge zones (2 times $r$). The band upswing $\varphi_0$ appearing in the band scheme within these space charge zones (in FIG. 2 only the conduction band is shown) is controlled by the dielectric constant as well as by the spontaneous polarization.

$$\left(\varphi_0 = \frac{e^2 r e}{2\epsilon}\right)$$

There thus results a strong temperature dependence of the blocking layer resistance. The maximum of the band upswing $\varphi_0$ and thereby of the resistance increase is achieved when the surface terms (N) are raised to the Fermi level. The height of the resistance maximum, therefore, is essentially determined by the activation energy of the surface terms. Since a blocking layer resistance is involved, there results especially in the range of maximal band spreading a strong voltage dependence of the resistance, the magnitude of which is determined macroscopically by the number of successively connected granule boundaries.

It is now known that the resistance temperature characteristics curve of such semi-conducting barium titanate ceramic material presents, depending on the starting material and conditions surrounding production, appreciable differences in the steepness and height of the resistance rise, while, however, in the height of the resistance rise four powers of ten between the resistance values before and after the increase are not exceeded. It was conjectured that the reason for the differences in steepness and height of the resistance increase is to be found in part in differences in the surface terms, which heretofore have been regarded as the most difficult factor to govern in the entire system. Thus it was already shown that a reduction (withdrawal of oxygen from the grid) lowers the resistance increase or completely destroys the surface blocking layers. The conjecture had even been expressed that the oxygen balance is the decisive factor for the creation of the surface blocking layers, but experiments (which have led to the present invention) show that even samples of the same gross composition, sintered at the same oxygen partial pressure, show considerable differences in the course of the resistance increase. In the diagram of FIG. 3 this may be explained with individual examples, in which Table I serves for the explanation of the individual curves. In this table there are shown individual $TiO_2$ materials (I to V) and barium carbonate (VI) with their impurities. The materials I to V were reacted in each case with barium carbonate VI to $BaTiO_3$, at about 1000°, which was provided with a doping of about 0.12 mol. percent of antimony oxide ($Sb_2O_3$) and was sintered for one hour at 1360° C. In the individual resistance temperature characteristics curves in FIG. 3, accordingly only the $TiO_2$ starting materials are different.

It is apparent and proved in extensive investigations that the resistance temperature characteristics curve of such cold conductors, with production conditions otherwise the same, vary strongly with the starting materials used. For this both differing impurities of this material and also different crystallization states may be determinative, as follows from Table I and the diagram according to FIG. 3. In general there can be derived from this summary the conclusion that with increasing degree of purity the cold conductor effect is diminished.

In the case of purest anatase (V) the abrupt resistance climb has disappeared except for a slight anomaly. It is interesting in this connection that the impurities listed in the table occur, at most, in concentrations such as are necessary for the theoretically calculated surface term density. Now, however, impurities of the starting material, especially in the case of products produced on a large scale, are largely remote from arbitrary influencing.

The invention involves a series of underlying problems: First of all, the influence of the impurities on the course of the resistance temperature curve are to be eliminated. Further, it should be achieved that the resistance increase is as steep as possible and, insofar as possible, lies constantly at least on the order of magnitude of four powers of ten. By specifically directed measures it should be achieved that the resistance temperature characteristic curve is altered to such an extent that ceramic bodies of such a material can also be used as capacitor dielectric and even as hot conductors—i.e. that insulating inter-layers are formed at the granule boundaries. The voltage dependence of the resistance value should be reduced.

The ceramic body of the type initially described is characterized, for the solution of this problem according to the invention, by a content of copper, iron or a combination thereof as additive metal in amounts of 0.001 to 0.2% by weight, calculated as CuO on $Fe_2O_3$ referred to the total weight of the body and that the additive metal is concentrated at the crystallite surfaces.

Employing copper, particularly for use in cold conductors the copper content amounts to 0.001 to 0.02% by weight.

For the use as capacitor dielectric a copper content is suggested of 0.01 to 0.05% by weight.

For use as a hot conductor a copper content of 0.02 to 0.2%, preferably 0.05 to 0.1% by weight is suggested.

Employing iron for use in cold conductors the iron content amounts to 0.001 to 0.01% by weight.

TABLE I
[Impurities (percent by wt.) (Spectral analysis)]

| Material | Cu | Al | Si | Mg | Fe | P | Ca | Sb | As | Sn | Pb |
|---|---|---|---|---|---|---|---|---|---|---|---|
| I. Anatase | $\sim 10^{-2}$ | $\sim 10^{-3}$ | $>10^{-3}$ | $\sim 10^{-3}$ | $\sim 10^{-3}$ | $\sim 10^{-1}$ | $\sim 10^{-3}$ | $\sim 10^{-2}$ | $<10^{-3}$ | $\sim 10^{-3}$ | $\sim 10^{-3}$ |
| II. Anatase | $<10^{-2}$ | $\sim 10^{-3}$ | $\sim 10^{-3}$ | $\sim 10^{-3}$ | $<10^{-3}$ | $\sim 10^{-1}$ | $\sim 10^{-3}$ | $<10^{-3}$ | $<10^{-3}$ | $<10^{-3}$ | $\sim 10^{-3}$ |
| III. Anatase | $\sim 10^{-2}$ | $\sim 10^{-3}$ | $>10^{-3}$ | $\sim 10^{-3}$ | $<10^{-3}$ | $\sim 10^{-1}$ | $\sim 10^{-3}$ | $<10^{-3}$ | $<10^{-3}$ | $<10^{-3}$ | $\sim 10^{-3}$ |
| IV. Rutilium | $<10^{-2}$ | $\sim 10^{-3}$ | $<10^{-3}$ | $\sim 10^{-3}$ | $>10^{-3}$ | $<10^{-1}$ | $\sim 10^{-3}$ | $<10^{-3}$ | $<10^{-3}$ | $<10^{-3}$ | $<10^{-3}$ |
| V. Anatase (max. pruity) | | $\sim 10^{-4}$ | $\sim 10^{-1}$ | $\sim 10^{-3}$ | $\sim 10^{-3}$ | | $\sim 10^{-3}$ | | | | |
| VI. $BaCO_3$ | $\sim 10^{-3}$ | $\sim 10^{-3}$ | $\sim 10^{-1}$ | $\sim 10^{-3}$ | $\sim 10^{-3}$ | | $\sim 10^{-4}$ | | | | |

Likewise, for use as capacitor dielectric, iron content is suggested of 0.01 to 0.05% by weight.

Similarly, for use as a hot conductor, an iron content of 0.01 to 0.1%, preferably 0.03 to 0.1% by weight is suggested.

In the cases cited, a part of the copper can be replaced by iron or vice versa, for example, half of the copper constituent is replaced by iron.

From Table I, which was set up on the basis of spectral analytical measurements and, therefore, indicates at best maximum contents, it is apparent that the starting materials already contained very small amounts of copper and iron. Nevertheless, there occur the variations set forth in FIG. 3. Surprisingly, it has proved that through the copper content specified there also occurs a specific influencing of the resistance temperature characteristis.

As a material alien to the perovskite grid, copper or iron moves in the sintering to the granule surfaces and produces there an interlayer having p-conduction, in the case of cold conductor material of slight low thickness (on an inifinitesimal order of magnitude as surface acceptor terms), in dielectric material and in hot conductors, in part, considerably greater thickness. The acceptor terms bringing about this p-conduction have, however, a very great spacing from the valence band in the band scheme, which lies on the order of up to 2 electron vols. Considerable energies, therefore, are necessary in order to move the defect electrons to conduction in this p-conducting interlayer. For this reason the interlayer has a good insulating effect at normal temperatures, so that in the case of a finite thickness of this interlayer, bodies result with a very high dielectric constant (DK) produced by the interlayers. The highly insulating interlayers surround the highly conducting material in the interior. In the case of stronger doping, on the one hand, the insulating interlayer becomes thicker and, on the other hand, copper is displaced to intergrid locations in the interior of the granules. Through the high activation energy the conductivity of the body becomes lower and lower at normal temperatures, whereas with a rise of the temperature the conductivity increases. This presents the typical behavior of a hot conductor.

In the present bodies the Curie temperature can be shifted in a manner known per se. For example, in the case of barium titanate, a small proportion of strontium or zircon brings about a lowering of the Curie temperature and thereby a shifting of the resistance increase temperature range to lower temperatures. while the adidtion of lead raises the Curie temperature above the BaTiO₃-value of about 120° C. and thereby shifts the resistance increase temperature range to higher temperatures. In bodies according to the invention, in the case of use for cold conductor resistors, there does, to be sure, always take place a slight increase of the cold conductor resistance, but, on the other hand, an appreciable reduction in the range of the resistance increases. The height of the resistance increase is always achieved on the order of four powers of ten. Table II illustrates this in several examples.

If to the barium titanate serving as starting material, or to the components mixed in the production of barium titanate, calcium oxide is added in amounts of 0.001 to about 0.1% by weight, an adjustment of the specific cold resistance below the Curie temperature is then possible. In connection with copper and/or iron, moreover, there is achieved a clear diminution of the variator properties, namely of the voltage dependence of the resistance value on an applied voltage at temperatures above the resistance increase. Additional details in this regard are hereinafter presented.

The diagram according to FIG. 4 illustrates a number of curves for the course of the resistance $\rho$ in dependence on the temperature utilizing copper, and FIG. 5 a similar diagram utilizing iron. For the production of the samples employing copper there were utilized the materials I and VI of Table I, and materials II and VI for samples employing iron. The material was in each case doped with 0.1% by weight of $Sb_2O_3$ for the production of the n-conductivity and produced according to the process above set forth.

Curve 1 of FIG. 4 corresponds to curve I in FIG. 3 of curve 1 of FIG. 5 to curve II of FIG. 3, and holds for the material of the type just described without inclusion of a copper or iron addition respectively. In Table I it is indicated, of course, that the material I contains approximately $10^{-2}\%$ by weight of copper or $10^{-3}\%$ of iron. Nevertheless, the effect ascertained through the invention for the copper and/or iron addition is not to be observed. This is due probably to the fact that either the results of the spectral analysis do not agree with the actual copper and/or iron content or that in conjunction with the many other impurities a specific effect is not to be observed. It may also be due, however, to the fact that the individual batches of the starting material differ from one another in their composition. Precisely for cold conductors, however, it is the object of the invention to assume the maintenance of a minimum content of CuO or $Fe_2O_3$. From Table II it will be apparent for what additive amounts of copper oxide or iron oxide the particular curves are applicable.

TABLE III

| | Fig. 4 Percent by weight CuO | Fig. 5 Percent by weight Fe²O³ |
|---|---|---|
| Curve: | | |
| 2 | 0.001 | 0.003 |
| 3 | 0.003 | 0.005 |
| 4 | 0.005 | 0.008 |
| 5 | 0.009 | 0.01 |
| 6 | 0.01 | 0.012 |
| 7 | 0.02 | 0.03 |
| 8 | 0.05 | 0.05 |
| 9 | 0.1 | 0.07 |
| 10 | 0.2 | |
| 11 | 0.4 | |

Curves 12 and 13 were recorded with a material which was not doped with $Sb_2O_3$. While the material for curve 12 contained an addition of 0.05% by weight of CuO, curve 13 shows the resistance course of barium titanate which contains neither antimony nor additional copper.

The diagrams according to FIGS. 4 and 5 show that depending upon the amount of added metal the bodies of such material can be used either as cold conductors or as hot conductors. A part of the materials utilizable for hot conductors have a very high apparent-DK of about 50,000 (tan δ ca. $3 \cdot 10^{-2}$ at 1 kc. measuring frequency). Known blocking layer capacitors which consist, for example, of barium titanate, in which the bodies thereof are first reduced completely through and then through an oxidizing treatment, there is produced on the body surface a very thin, fully oxidized barium titanate layer, also show, to be sure, when the entire body is considered as a dielectric, a very high apparent DK, but the breakdown stability of these so-called blocking layer capacitors is very low.

If bodies according to the present invention are used as a dielectric, then, first of all, the reduction and oxidation processes, in part very difficult to carry out, are avoided, for the bodies of this material can be used directly as a dielectric. Further there results the advantage that the dielectric strength is appreciably increased, because on the surfaces of the good insulating layers situated on the crystallites there lies in each case only a fraction of voltage applied to the whole body. The capacitance of a capacitor with a body according to the invention as dielectric is dependent on the number of insulating layers successively connected in the equivalent circuit diagram on the crystallite surfaces. By enlargement of the crystallites, the capacitance can accordingly be increased.

FIG. 6 is a rough representation of the relations in a polycrystalline body according to the invention, and, particularly, in the present case three granules or particles are illustrated as a section from such a body. The inner granule, designated by the letter $n$, of the crystallites, is well $n$-conducting in consequence of doping, for example with antimony. The surface layers designated by the letter $p$ on the crystallites are in themselves $p$-conducting. Because of the very high band spacing of the acceptor

TABLE II

| Composition | TiO₂ material according to Table I | Additive substance | Additive in (percent) approx. | Spec. cold resistance approx. (Ω-CM.) | Resistance increase range (° C.) approx. | Resistance increase height (powers of ten) approx. | Resistance increase in steep range (per ° C.) approx |
|---|---|---|---|---|---|---|---|
| BaTiO₃=120°-Typ, Tc=120° C | II | | | 10-20 | 110-120 | 1-2.3 | 0.1-0.3 |
| (BaSr) (TiSn)O₃ 20°-Typ | II | | | 120-150 | 130 | 3.5 | 9 |
| (BaSr) (TiSn)O₃ 0°-Typ | II | | | 700 | 120 | 3.3 | 5 |
| BaTiO₃ 120°-Typ | I | CuO | 0.003-0.005 | 30-50 | 40 | 3.9 | 66 |
| BaTiO₃ 120°-Typ | II | Fe₂O₃ | 0.008 | 40 | 60 | 3.7 | 21 |
| BaTiO₃ 120°-Typ | III | CuO | 0.006 | 40 | 40 | 3.9 | 71 |
| BaTiO₃ 120°-Typ | III | Fe₂O₃ | 0.005 | 70 | 40 | 3.8 | 117 |
| BaTiO₃ 120°-Typ | II | CuO | 0.006 | 50 | 50 | 4.1 | 85 |
| BaTiO₃ 120°-Typ | II | CuO+CaO | 0.006-0.01 | 50 | 50-60 | 4.5 | 63 |
| BaTiO₃ 120°-Typ | I | CuO+CaO | 0.008 | 60 | 50 | 4.5 | 125 |
| (BaSr)TiO₃ 60°-Typ | II | CuO+CaO | 0.008-0.01 | 40-50 | 60 | 4 | 14 |
| (BaSr)(TiSn)O₃ 20°-Typ | II | CuO+CaO | 0.006-0.01 | 150-200 | 80-90 | 4.4-4.7 | 21 |
| (BaSr)(TiSn)O₃ 0°-Typ | II | CaO | 0.05-0.1 | 100-150 | 120 | 3.6 | 9 | terms and of the accordingly very high activation energy, these surface layers are under normal conditions, i.e., below the Curie temperature, very poorly conducting and can be regarded practically as insulating layers. The thickness of the surface layers $p$ fluctuates according to the amount of the additive metal constituent. In FIG. 6, for example, the relations are shown in a way such as they might be present in the use of bodies according to the invention for capacitor dielectrics.

The diagram according to FIG. 7 illustrates the course of the capacitance of a plate or disk capacitor with a body according to the invention having a diameter of 10 mm. and a thickness of 1 mm., in dependence on the temperature, at a measuring frequence of 1 kc.

With increasing amount of additive metal, in cold conductors the varistor effect becomes less and less. Besides the control of the varistor effect through choice of smaller crystallite sizes, this presents a further control possibility of the varistor effect which is always of value when the granule growth cannot be inhibited.

FIG. 8 illustrates curves 2 to 9 which apply to the following additive amounts, while curve 1 holds for a material without addition of copper.

| Curve: | Percent by weight CuO |
|---|---|
| 2 | +0.001 |
| 3 | +0.003 |
| 4 | +0.005 |
| 5 | +0.006 |
| 6 | +0.009 |
| 7 | +0.01 |
| 8 | +0.02 |
| 9 | +0.05 |

The curves are recorded for the ratio $R/R_0$ in dependence upon the applied voltage, in volt/cm., R being the resistance at the applied raised voltage, while $R_0$ signifies the resistance at 10 volt./cm. The decrease of the varistor effect is clearly apparent from the diagram according to FIG. 8.

FIG. 9 illustrates a body 21 according to the invention, the body being composed of the parts 22 and 23, which two parts are each individually prefabricated and then sintered together. Part 22 consists of barium titanate (material I+VI or II+VI according to Table I) with a doping of 0.1% $Sb_2O_3$. This part 22 is thus well n-conducting. Part 23 is composed of the same material as the part 22, with an additional content of 0.1% CuO or 0.1% $Fe_2O_3$. This part therefore is predominantly p-conducting. The coatings 24 and 25 applied to body 21 serve for the contacting. The junction surface 26 presents a pn-transition when the entire body is maintained at temperatures at which sufficient free charge carriers are present. If the coating 24 is connected to a positive potential and the coating 25 to a negative potential there then forms at the junction a pn-transition which on application of a voltage is blocking. If, on the other hand, the coating 25 is positively connected and coating 24 negatively connected, the pn-transition does not block conductive direction.

The current-voltage characteristic of a barium titanate diode as illustrated in FIG. 8 will be evident from a reference to FIG. 10. To the right of the ordinate there flows with rising voltage a strongly rising current, while to the left of the ordinate, that is, when the pn-transition is poled with blocking effect, practically no current flows.

For many technical utilizations (parametric amplifiers, frequency multipliers, modulator, etc.) voltage-dependent capacitors are desired. The ferroelectric materials that have hitherto become known, $SrTiO_3$ or $(BaSr)TiO_3$ present only a relatively low capacitance change at reasonable control voltages.

Another disadvantage of such substances is that they show an appreciable voltage-dependence merely in the range of the Curie point and, accordingly, are strongly temperature-dependent. In the case of $SrTiO_3$, therefore, cooling with liquid hydrogen is necessary (Curie point: $-240°$ C.). $(BaSR)TiO_3$ ceramic material, on the other hand, can be so selected that the curie point lies in the range of room temperature. The bodies here proposed now combine the advantages of good controllability of the varactor diodes with the higher amplifier performance, for example, of $SrTiO_3$ or of $(BaSr)TiO_3$.

The bodies according to the invention which have been described above as capacitor dielectric material excellently fulfill this function because the individual n-conducting crystallites therein are enclosed by an insulating or weakly p-conducting layer.

They thus present practically a series circuit of n-p-n transitions. In the range of room temperatures, in the case of substances with a Curie point of 120° C., apparent DK values are achieved of 20,000 to 50,000. These DK values are strongly voltage-dependent, since in consequence of the conductive core of the individual crystallites the voltage applied to the external electrodes drops practically only at the granule boundaries, so that considerable field strengths here occur. In particular, a strong voltage-dependence is already found far below the Curie point (Curie temperature, for example 120° C.). FIG. 11 illustrates some idea thereof. In order to make possible a comparison with prior ferroelectric materials, the voltage dependence of the DK of $(BaSr)TiO_3$ is also drawn in (Curie point: $\sim 20°$ C.). Measuring temperature ca. 20° C., measuring frequency, for example, 10 kc. It will be noted from the figure how extraordinarily great the effect is.

In the proximity of the curie point the voltage dependence of the capacitance is, of course, still greater.

Since with this material we are dealing practically with capacitors connected in series (only the p-conducting layers on the surface of the crystallites being effective) depending on granule size and thickness of the interlayers, a more or less great controllability is achieved.

FIG. 12 represents a circuit diagram for the measurement of the voltage dependence of the capacitance. The capacitor 110, which has a body according to the invention as dielectric, is connected over a choke 111 and over a direct line 112 with the direct current source 113 (control voltage). On the other hand, the capacitor 110 is connected over capacitors 114 and 115 with a measuring bridge 116, which is operated with an oscillator having, for example, a frequency of 10 kc.

For the production of bodies according to the invention, preferably, the following process is proposed:

The perovskite-forming starting substances are mixed with one another in the desired amounts, in the form of oxides or oxide-yielding compounds (for example, carbonates) with addition of the doping substance and of the additive metal, ground with 0.5 liter of distilled water per mole of preparation, then dried and reacted at about 1050° C. in an oxidizing atmosphere, for example, in an oxygen stream, for a period of about one hour per mole of preparation. The reaction product is again ground with 0.5 liter of distilled water per mole of preparation for 24 hours in a ball mill to the desired granule size. From the milled material, following drying, an addition of binders known per se, the desired bodies are formed, for example pressed, and these are sintered at about 1360° C. in an oxidizing atmosphere, for example, in an oxygen stream for about one hour. According to the intended use, electrodes are applied in a manner generally well known per se.

For the production of a body according to FIG. 9, disks are pressed of milled material comprising materials indicated in connection with the description of FIG. 9 and two such disks, one with additive metal and one without such additive metal, are then pressed together and sintered as above described.

Changes may be made within the scope and spirit of the appended claims, which define what is believed to be new and desired to have protected by Letters Patent.

We claim:
1. A polycrystalline ceramic body with an average crystallite size 1 and 50 microns, which is partially n-conducting and partially p-conducting, consisting of doped ferroelectric material and perovskite structure of the general formula $Me^{II}Me^{IV}O_3$, with a doping substance of 0.1 to 0.12 parts by weight for the n-conduction selected from a class consisting of antimony, niobium and lanthanum, in which the $Me^{II}$ comprises at least one metal selected from a class consisting of barium, and strontium and the $Me^{IV}$ comprises at least one metal selected from a class consisting of titanium, zircon and tin, the proportion of the $Me^{IV}$ metal being up to about 2 mol. percent greater than the proportion of the $Me^{II}$, characterized by a content of additive metal, selected from the class consisting of copper and iron, said additive metal being present in amounts of 0.001 to 0.2% by weight, calculated as CuO and $Fe_2O_3$, referred to the total weight of the body, the additive metal being concentrated at the crystalline surfaces.

2. A ceramic body according to claim 1, wherein said additive metal is copper.

3. A ceramic body according to claim 2, especially for use in cold conductor resistors, wherein the copper content amounts to 0.001 to 0.02% by weight, calculated as CuO, referred to the total weight of the body.

4. A ceramic body according to claim 2, especially for use as a capacitor dielectric, wherein the copper content amounts to 0.01 to 0.05% by weight, calculated as CuO, referred to the total weight of the body.

5. A ceramic body according to claim 2, especially for use in hot conductor resistors, wherein the copper content amounts to 0.02 to 0.2% by weight, preferably 0.05 to 0.2% by weight, calculated as CuO, referred to the total weight of the body.

6. A ceramic body according to claim 1, wherein said additive metal is iron.

7. A ceramic body according to claim 6, especially for use in cold conductor resistors, wherein the iron content amounts to 0.001 to 0.01% by weight, calculated as $Fe_2O_3$, referred to the total weight of the body.

8. A ceramic body according to claim 6, especially for use as a capacitor dielectric, wherein the iron content amounts to 0.01 to 0.03% by weight, calculated as $Fe_2O_3$, referred to the total weight of the body.

9. A ceramic body according to claim 6, especially for use in hot conductor resistors, wherein the iron content amounts to 0.01 to 0.1% by weight, preferably 0.03 to 0.1% by weight, calculated as $Fe_2O_3$, referred to the total weight of the body.

10. A ceramic body according to claim 1, wherein said additive metal comprises both copper and iron.

11. A method for the production of a ceramic body with an average crystallite size between 1 and 50 microns, which is partially n-conducting and partially p-conducting, consisting of doped ferroelectric material with perovskite structure of the general formula $Me^{II}Me^{IV}O_2$, with a doping substance for the n-conduction selected from a class consisting of antimony, nobium, bismuth, tungsten, lanthanum or rare earth (lanthanides) in which the $Me^{II}$ comprises at least one metal selected from a class consisting of barium, strontium, calcium, lead, and the $Me^{IV}$ comprises at least one metal selected from a class consisting of titanium, zircon and tin, the proportion of the $Me^{IV}$ metal being up to about 2 mol. percent greater than the proportion of the $Me^{II}$, and having a content of additive metal, selected from the class consisting of copper and iron, said additive metal being present in amounts of 0.001 to 0.2% by weight, calculated as CuO and $Fe_2O_3$, referred to the total weight of the body, the additive metal being concentrated at the crystallite surfaces, comprising the steps of mixing the perovskite-forming starting material, in amounts necessary for the composition, in the form of oxides or oxide-yielding compounds, with admixture of the doping substance and the additive metal, adding 0.5 liter of distilled water per mole of preparation and grinding the so mixed preparation, drying the ground preparation, reacting the dried preparation at about 1050° C. in an oxidizing atmosphere for a period of about one hour per mole of preparation, again adding 0.5 liter of distilled water per mole of preparation for 24 hours in a ball mill, drying the reground preparation, adding any desired known binders, forming the desired bodies from such preparation, and sintering the formed bodies at about 1360° C. for one hour in an oxidizing atmosphere.

References Cited
UNITED STATES PATENTS 3,068,177  12/1962  Sugden _____ 252—62.9

LEON D. ROSDOL, *Primary Examiner.*

J. D. WELSH, *Assistant Examiner.*

U.S. Cl. X.R.

106—39; 252—62.62, 62.9, 63.2, 519; 264—104; 317—258; 338—22